Patented Dec. 11, 1923.

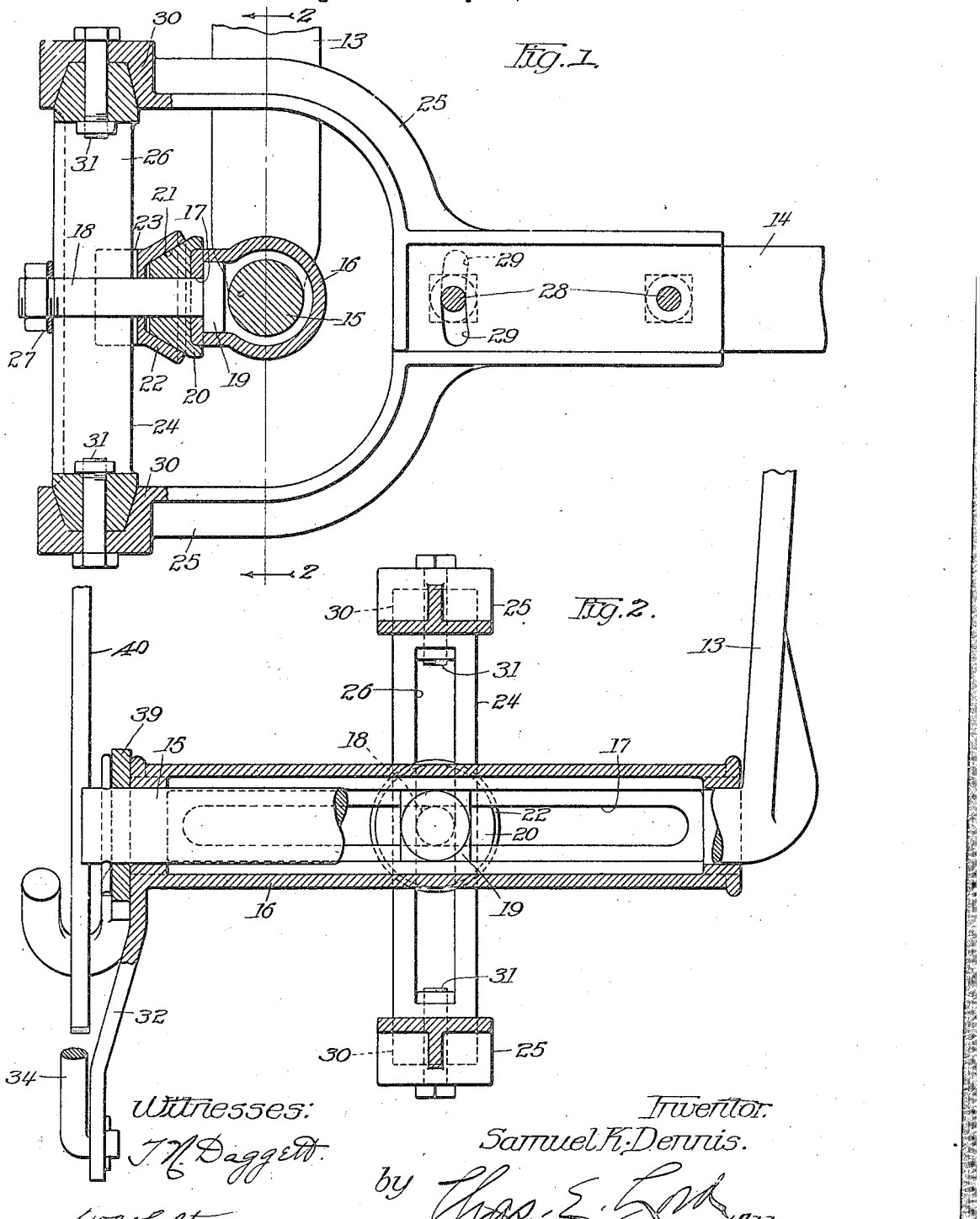

1,477,324

UNITED STATES PATENT OFFICE.

SAMUEL K. DENNIS, OF CHICAGO, ILLINOIS, ASSIGNOR TO INTERNATIONAL HARVESTER CORPORATION, A CORPORATION OF NEW JERSEY.

CULTIVATOR-BEAM COUPLING.

Original application filed September 3, 1914, Serial No. 860,035. Divided and this application filed May 6, 1921. Serial No. 467,378.

*To all whom it may concern:*

Be it known that I, SAMUEL K. DENNIS, a citizen of the United States, residing at Chicago, in the county of Cook and State of Illinois, have invented certain new and useful Improvements in Cultivator-Beam Couplings, of which the following is a full, clear, and exact specification.

This invention relates to cultivators and this application is a division of original Serial Number 860,035, filed September 3, 1914. The objects of the invention are to simplify the construction of the coupling by which the cultivator beams are connected to the beam support or arch and to provide a construction of this type that allows quick and easy adjustment of the beam. This is accomplished by connecting the beam and arch by means of intersecting members each adjustable longitudinally of the other and adapted to be clamped together at any position of adjustment by a single clamping element or bolt.

Referring to the drawings:

Fig. 1 is a side view partly in section showing the connection employed between each of the cultivator beams and the front supporting member or arch;

Fig. 2 is a sectional view taken on line 2—2 of Fig. 1.

Referring in detail to the form of my invention illustrated herewith, 13 designates the depending end of the cultivator arch which is provided with horizontal extensions or spindle portions 15 upon each of which is rotatably mounted a sleeve 16, said sleeve being provided in its front wall with a longitudinally extending slot 17. Into this slot is inserted a bolt 18, the surrounding wall of the sleeve being sufficiently spaced from the spindle portion 15 to permit the bolt head 19 to move between the parts. A clamping member 20 is arranged upon the bolt in non-rotatable engagement with the sleeve and its periphery is beveled or cone-shaped, as shown at 21, to enter a complemental member 22, which latter is provided with a curved portion 23, within which is seated a member 24 having the forked ends 25 of one of the cultivator beams 14 pivoted thereto for lateral movement. The pivotal connection between the fork member 25 and the member 24 comprises depressions 30 in the ends of the fork arms, in which depressions the member 24 is rotatably fitted and vertical bolts 31 connect the parts in pivotal relation. The fork members 25 are in two parts, each detachably connected with the beam 14 by means of two bolts 28, one of which is received in a slot 29 so that the two members of the fork 25 may be swung away from each other to allow member 24 to be inserted. This member 24 is provided with a vertical slot 26, through which the bolt 18 is extended and clamped thereon by means of a nut and washer 27. With this construction, when the nut 27 is loosened the cultivator beam may be moved in a vertical direction owing to the presence of slot 26 and in a lateral direction by reason of the slots 17 and may be rotated in either direction on a longitudinal axis on account of the clamped members 20 and 22. This last adjustment is of advantage when it is desired to operate one of the cultivator beams at a greater or less depth than its associated beam, and in this connection the usual adjustment would be to run the inner shovel slightly higher than the outer shovel so as not to interfere with the roots of the plants. This is a desirable adjustment in cultivating corn that is well advanced in growth.

On Fig. 2 of the drawing, sleeve 16 is shown as provided with a crank 32, to which is attached a link 34, which elements are related to the spring lift for the cultivator beams, and at 39 the diagonal brace rod for the cultivator arch is shown in cross section, and 40 designates a vertical brace of the same character which engages a hook on the end of brace 39. These parts are not concerned in the present invention. From the above description, it will be seen that I have devised a simple form of coupling permitting a wide range of adjustment and one capable of easy and quick operation as only one nut requires loosening in order to make any and all adjustments possible.

I claim as my invention:

1. In a cultivator, gang members, a support therefor, a connection between each of said gang members and the support, comprising a horizontally extending rotatable sleeve having a longitudinal slot formed therein, a fork connected to the gang member, a member on which the arms of said fork are pivoted to swing laterally, said member having a vertical slot, a single fastening element extending through both of said slots for connecting said member with the rotatable sleeve, and means cooperating with said fastening element for permitting angular adjustment of said fork about the axis of said fastening element.

2. In a cultivator, gang members, a support therefor, a connection between each of the gang members and the support comprising a rotatable sleeve carried horizontally on the support and provided with a longitudinal slot, a vertically arranged member provided with a longitudinal slot, a fork having members pivotally connected to said vertically arranged member and secured to the gang member, a single bolt extending through said vertical and longitudinal slots for connecting the rotatable sleeve and vertically arranged member together, and means arranged between said vertically arranged member and rotatable sleeve capable of permitting longitudinal axial rotation of said gang member when the bolt is released.

3. In a cultivator, gang members, a support therefor, spindle portions on said support horizontally arranged, and a connection between each of said gang members and spindle portion comprising a rotatable sleeve provided with a longitudinal slot, a frictional clamping member carried non-rotatably on said sleeve, a clamping member to coact with said frictional clamping member, an upright member in engagement with said coacting clamping member and having a vertical slot, a single bolt extending through said slots and through the clamping members for holding the parts in frictional engagement, and connections between said upright and gang member.

In testimony whereof I affix my signature.

SAMUEL K. DENNIS.